United States Patent [19]

Kroon

[11] Patent Number: 4,868,370
[45] Date of Patent: Sep. 19, 1989

[54] DEVICE FOR SUPPLYING HOT WATER

[75] Inventor: Arie Kroon, Bergen, Netherlands

[73] Assignee: Verheijen, B.V., Netherlands

[21] Appl. No.: 117,063

[22] Filed: Nov. 5, 1987

[30] Foreign Application Priority Data

Nov. 5, 1986 [NL] Netherlands ............... 8602802

[51] Int. Cl.$^4$ ............................................. H05B 1/02
[52] U.S. Cl. ................................. 219/295; 219/328; 219/447
[58] Field of Search ............... 219/10.55 B, 295, 296, 219/497, 494, 501, 508, 506, 328, 496; 99/325, 342, 328, 330, 333, 329

[56] References Cited

U.S. PATENT DOCUMENTS

| 2,868,178 | 1/1959 | Peters | 122/32 |
| 4,097,707 | 6/1978 | Kobayashi et al. | 219/10.55 B |
| 4,230,731 | 10/1980 | Tyler | 219/10.55 B |
| 4,309,585 | 1/1982 | Doi et al. | 219/10.55 B |
| 4,330,702 | 5/1982 | Cheng | 219/308 |
| 4,337,388 | 6/1982 | July | 219/308 |
| 4,551,611 | 11/1985 | Longo | 219/506 |
| 4,600,124 | 7/1986 | Price | 219/308 |
| 4,713,525 | 12/1987 | Bastep | 219/308 |

FOREIGN PATENT DOCUMENTS

| 1373011 | 12/1962 | France . |
| 926671 | 5/1963 | United Kingdom . |
| 2135143 | 8/1984 | United Kingdom . |

Primary Examiner—Mark Paschall
Attorney, Agent, or Firm—Cushman, Darby & Cushman

[57] ABSTRACT

Device for supplying hot water, in particular for the preparation of a drink, comprising a reservoir with heating unit with which a quantity of water in the reservoir is kept at a desired temperature, and a control unit which controls the heating unit depending on signals supplied by a temperature sensor present at or in the reservoir. After the device is switched on, the water present in the reservoir is heated to the boiling point. After detection of the boiling point, the control unit determines a maximum temperature at a predetermined distance below the boiling point and the water in the reservoir is then maintained at a desired temperature which is not higher than the determined maximum temperature.

3 Claims, 5 Drawing Sheets

DEVICE FOR SUPPLYING HOT WATER

BACKGROUND OF THE INVENTION

The invention relates to a device for supplying hot water, in particular for the preparation of a drink, comprising a reservoir with heating unit with which a quantity of water in the reservoir is kept at a desired temperature, and a control unit which controls the heating unit depending on signals supplied by a temperature sensor present at or in the reservoir.

Such devices are known in various embodiments. In said known devices, the combination of control unit and temperature sensor is generally embodied in the form of a relatively simple thermostatic circuit which is used to keep the water in the reservoir at the desired temperature. This thermostatic circuit is adjusted by the manufacturer to a particular temperature value and cannot thereafter be altered by the user, at least not in a simple manner. In said devices the temperature of the water is preferably maintained below the boiling point in order to reduce the power consumption by the heating unit as much as possible. In a device for the preparation of a drink, such as coffee-making machine, the temperature will, for example, be adjusted to 98° C. so that the water is maintained just below the boiling point temperature of approximately 100° C. If the device is used, however, at a fairly high geographical altitude, for example in mountainous regions and the like, then the boiling point temperature of water on the site will be much lower, in particular it may be lower than 98° C., which has been taken as an example in the above, with the result that the heating unit remains continuously switched on, the water is kept on the boil and much electrical power is wasted.

Until now it has been usual, if it is known that the device concerned has to operate at a fairly high geographical altitude at which the boiling point temperature of water is less than 100° C., to adjust the thermostat in a manner such that the water in the reservoir just fails to start to boil. This means, however, a special adjustment of the thermostat at the manufacturer's premises for each customer, as a result of which the manufacturing process is impeded.

SUMMARY OF THE INVENTION

The invention therefore has the object of providing a device with which this problem is overcome.

The invention provides in accordance with this object a device of the type mentioned in the introduction which, according to the invention, is characterized in that, after the device is switched on, the water present in the reservoir is heated to the boiling point, in that, after detection of the boiling point, the control unit determines a maximum temperature at a predetermined distance below the boiling point and in that the water in the reservoir is then maintained at a desired temperature which is not higher than the determined maximum temperature.

Because the boiling point temperature is determined first of all every time the device is switched on by bringing the water in the reservoir to the boil and the temperature of the water is then reduced to some extent, the user can be sure that, regardless of the altitude at which the device is used, the water is maintained at a temperature under the boiling point temperature which prevails at the site.

In the simplest embodiment, the desired temperature is equal to the determined maximum temperature. In that case a subtraction operation, which is simple to implement, in which the signal of the sensor is reduced by a predetermined value, is sufficient to find the maximum temperature and, consequently, the desired temperature at which the water must continue to be maintained.

According to the further development, however, it is also possible to select the temperature below the fixed maximum temperature by means of adjustment means. In that case, the user is not restricted to the maximum temperature determined by the device itself, while, nevertheless, the water is prevented from being kept on the boil regardless of the geographical altitude.

The invention will be explained below in more detail on the basis of the accompanying figures.

DETAILED DESCRIPTION OF THE PRESENTLY PREFERRED EXEMPLARY EMBODIMENT

Figure 1:
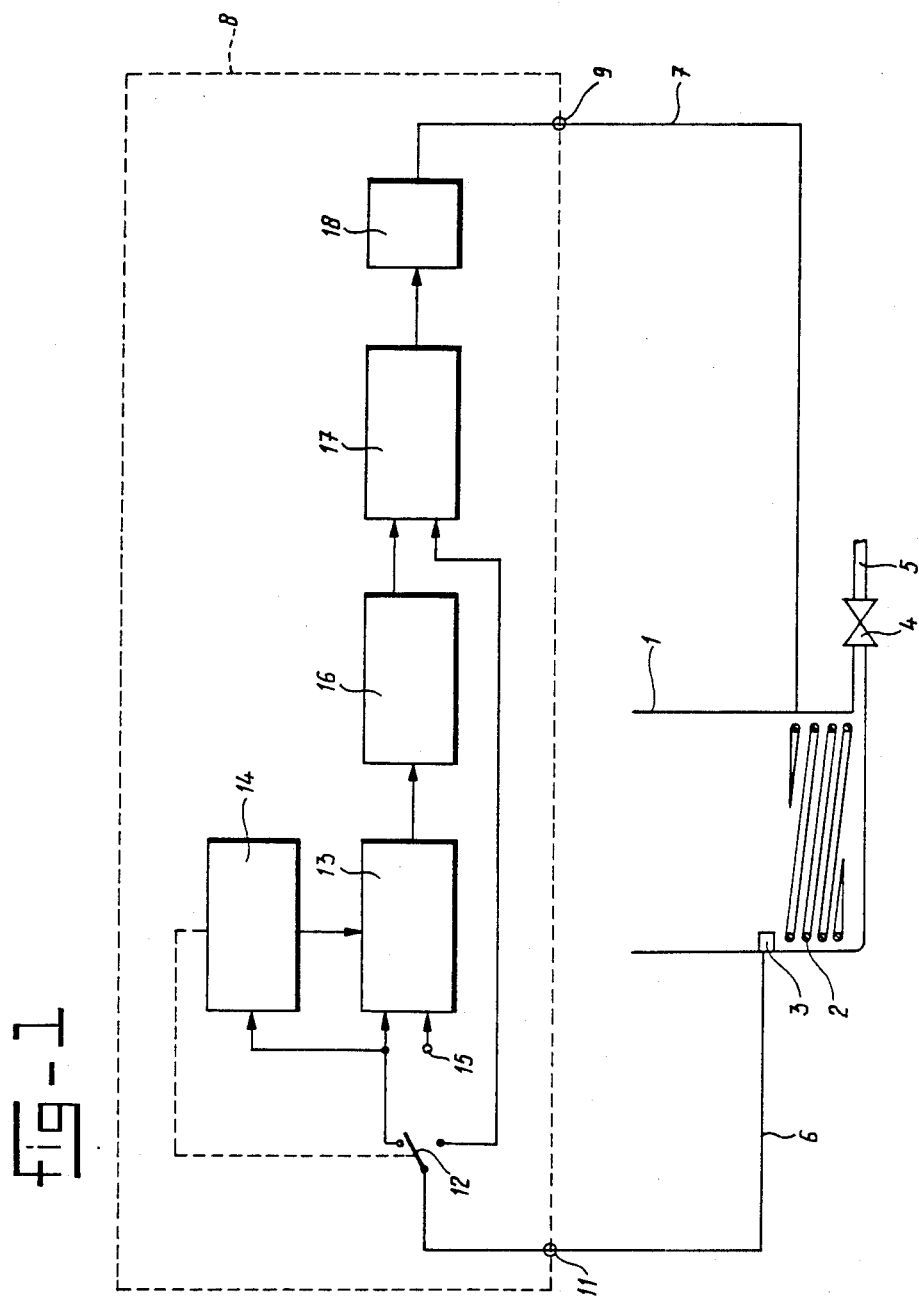
FIG. 1 shows a circuit which can be used in the control unit of the device for implementing the invention.

In FIG. 1 a reservoir 1 is shown very diagrammatically with a heating element 2 and a temperature sensor 3 therein. The reservoir 1 is connected via a tap 4 to the water pipe 5 of which only a section is shown.

The temperature sensor 3 is connected via the conductor 6 to the input 11 of the circuit shown within the frame 8, while the heating unit 2 receives control signals via the conductor 7 from the output 9 of the said circuit. The circuit inside the framing 8 may form part of a known control unit of the device, which control unit, for example, may also provide for the opening and closing of the tap 4. However, the further functions of the control unit are, on the one hand, not of importance within the scope of the present application and, on the other hand, are assumed to be known and will therefore also not be discussed in detail.

As has already been stated, the circuit inside the framing 8 receives a signal from the temperature sensor 3 via the input 11. Said signal is fed via the switch 12 which, after the device has been switched on, assumes the position shown in FIG. 1, to the first input of a subtraction unit 13, on the one hand, and to the input of a change detection unit 14, on the other hand. To the other input of the subtraction unit 13 a signal is applied which is representative of a predetermined temperature difference $\Delta T$.

The output of the subtraction unit 13 delivers a signal to the memory 16, whose output is connected to a first input of the comparator 17. If the switch 12 is switched over, the temperature signal from the sensor 3 is applied to the other input of the comparator 17. The output of the comparator 17 is coupled via a buffer amplifier to the output 9 of the circuit, via which output a signal is applied to the conductor 7 for controlling the heating unit 2.

The operation of said circuit will be discussed in more detail below both with reference to FIG. 1 and to FIG. 2. When the device is switched on, the switch 12 is in the position as shown in FIG. 1. Furthermore, in this condition, there is, at the output of the comparator 17, a switch-on signal which, via the buffer amplifier 18, ensures that the heating unit 2 is switched on. The cold water initially present in the device is gradually heated up until the water starts to boil. The varying temperature occurring in this phase of the operation is detected by the sensor 3 and the signal corresponding thereto is fed to the change detection unit 14. As long as a changing signal occurs, said detection unit will not deliver an output signal to the subtraction unit 13. If the water in the reservoir 1 has, however, reached the boiling point, then the temperature thereof will not change further. In the change detection unit 14 it is now detected that, during a predetermined period, no further change has occurred in temperature and from this criterion it is deduced that the water has reached the boiling point. As a result thereof, a signal is fed by the change detection unit 14 to the subtraction unit 13 which, in response thereto, subtracts a temperature difference signal, applied via the connection 15 to a second input, from the temperature signal at its first input. Said temperature difference signal $\Delta T$ may be a fixed signal which is applied by the control unit, not shown in the figure, to the input 15, but may also consist of a signal which can be adjusted as required by the user. This last possibility is dealt with in yet further detail below.

In response to the activation signal delivered by the change detection unit 14, the subtraction unit 13 emits at its output a signal which corresponds to a temperature equal to the temperature measured by the sensor 3 and reduced by the temperature difference $\Delta T$. This temperature value is stored in the memory 16. The memory 16 delivers in turn a signal corresponding to the stored temperature value to the first input of the comparator 17. The change detection unit 14 has in the meantime, at the same time as emitting a signal to the subtraction unit 13, also delivered a signal to the switch 12 in order to switch the latter to the other position so that the temperature signal originating from the sensor 3 is now applied to the second input of the comparator 17. The comparator 17 initially determines that the temperature of the water in the reservoir 1 will be too high, with the result that a switch-off signal is applied to the output of the comparator 17 so that, via the buffer amplifier 18, the heating unit 2 is switched off until the temperature of the water in the reservoir 1 corresponds to the temperature value represented by the signal in the memory 16.

Figure 2:
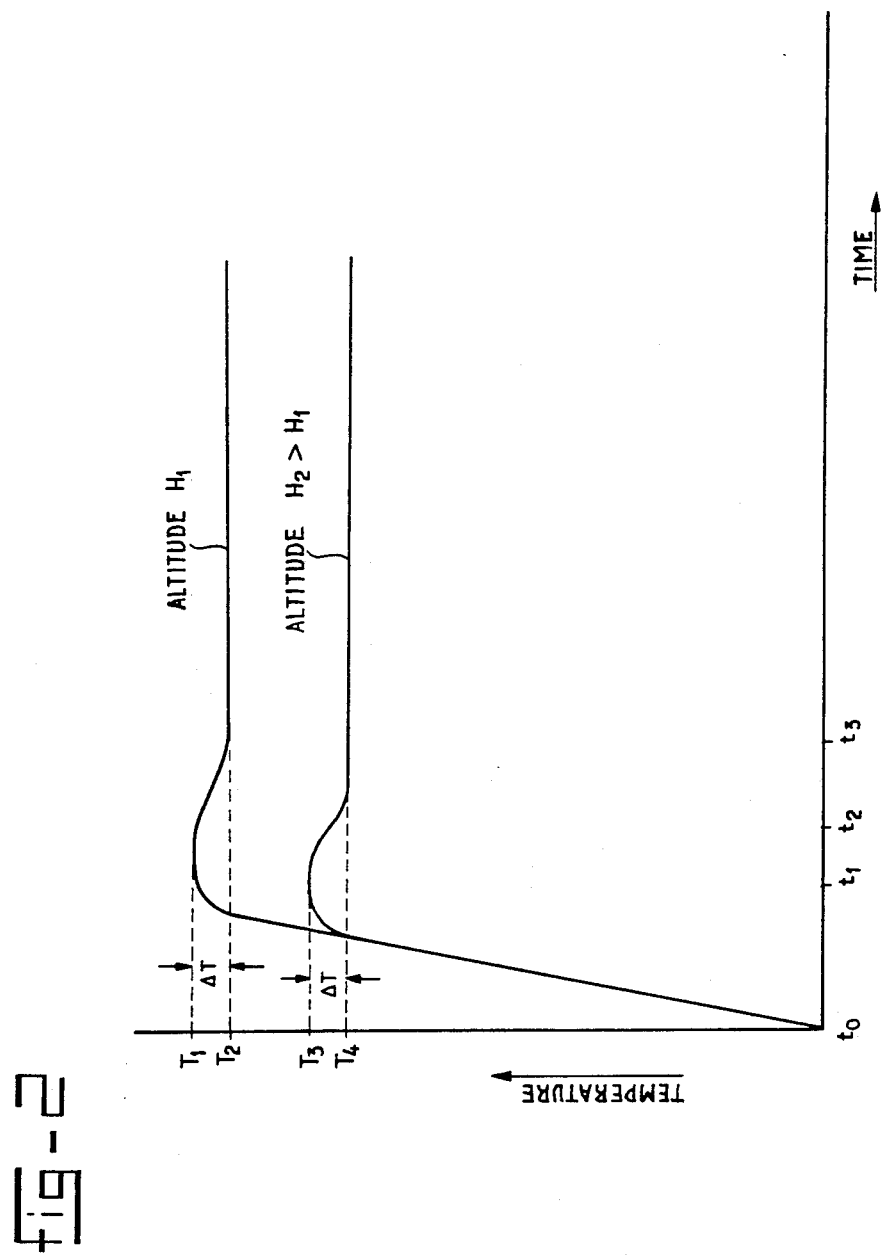
FIG. 2 shows a time diagram to explain the operation of the circuit from FIG. 1.

FIG. 2 illustrates the operation of the circuit graphically. As is evident from said figure, at a low geographical altitude H1 (for example, approximately sea level) the temperature will gradually rise after the device is switched on at the time instant t0 until the boiling point temperature t1 is reached at the time instant t1. At the time instant t2, the change detection unit 14 determines that the boiling point has been reached and it provides in the manner described for the switching off of the heating unit 2. This results in a drop of the temperature until, at the time instant t3, the temperature T2 has been reached, which corresponds to T1-$\Delta T$. The comparator 17 now detects the equality of the temperature at its two inputs and provides a switch-on signal for the heating unit 2 at its output. From that instant on, the circuit will continue to function as a normal thermostatic circuit, with which the water in the reservoir 1 is maintained at the temperature T2.

The operation of the device described hitherto is independent of the actual boiling point temperature. The boiling point temperature of water, however, varies considerably with the geographical altitude as is evident from the table below:

| Altitude | Boiling point temperature |
| --- | --- |
| 0 m | 100° C. |
| 1000 m | 96° C. |
| 2400 m | 92° C. |
| 4000 m | 86° C. |
| 5600 m | 81° C. |

From this table it is evident that, if the device is used at an altitude higher than the altitude H1 in the case described above, for example in a mountain restaurant at an altitude of 2400 m, the boiling point is already reached at a lower temperature. The functional description of the device is also, however, completely identical for this case to the description already given.

FIG. 2 illustrates the situation when used at a higher altitude H2 by a second curve. If used at this altitude, the boiling point will already be reached at a temperature T3. The circuit inside the framing 8 ensures in the manner described that, after this boiling point temperature T3 is reached and after the latter has been detected, a fall in the temperature of $\Delta T$ occurs, after which the temperature of the water in the reservoir is maintained at the temperature T4.

In the foregoing a reference has already been made to the possibility of making the temperature difference value $\Delta T$ adjustable for the user. In such an embodiment a control knob will be present on the outside of the device with which $\Delta T$ can be adjusted, provided that $\Delta T$ always has a minimum value determined during the manufacturing process in order to prevent $\Delta T = 0$ being chosen.

FIG. 1 shows diagrammatically a device in which the reservoir 1 is filled via a tap 4 from the mains water supply 5. Without any modification, however, the invention can also be applied in other types of reservoirs, for example a reservoir of the displacement type, in which a certain volume of cold water is poured in via a down-column, the same volume of hot water being tapped off from the reservoir at the same time via a syphon. Such devices are known per se and do not require further explanation.

Although a block diagram of an embodiment of a circuit is shown inside the framing 8 in FIG. 1, it will be clear that the described signal processing can also be implemented in another manner. In particular, it is possible to implement the circuit inside the framing 8 by means of a digital processor to which the signal is fed from the sensor 3 via an analog/digital converter and which delivers a control signal for the heating unit 2 via a digital/analog converter. Processors with built-in A/D and D/A converters are commercially obtainable per se as component.

Figure 3:
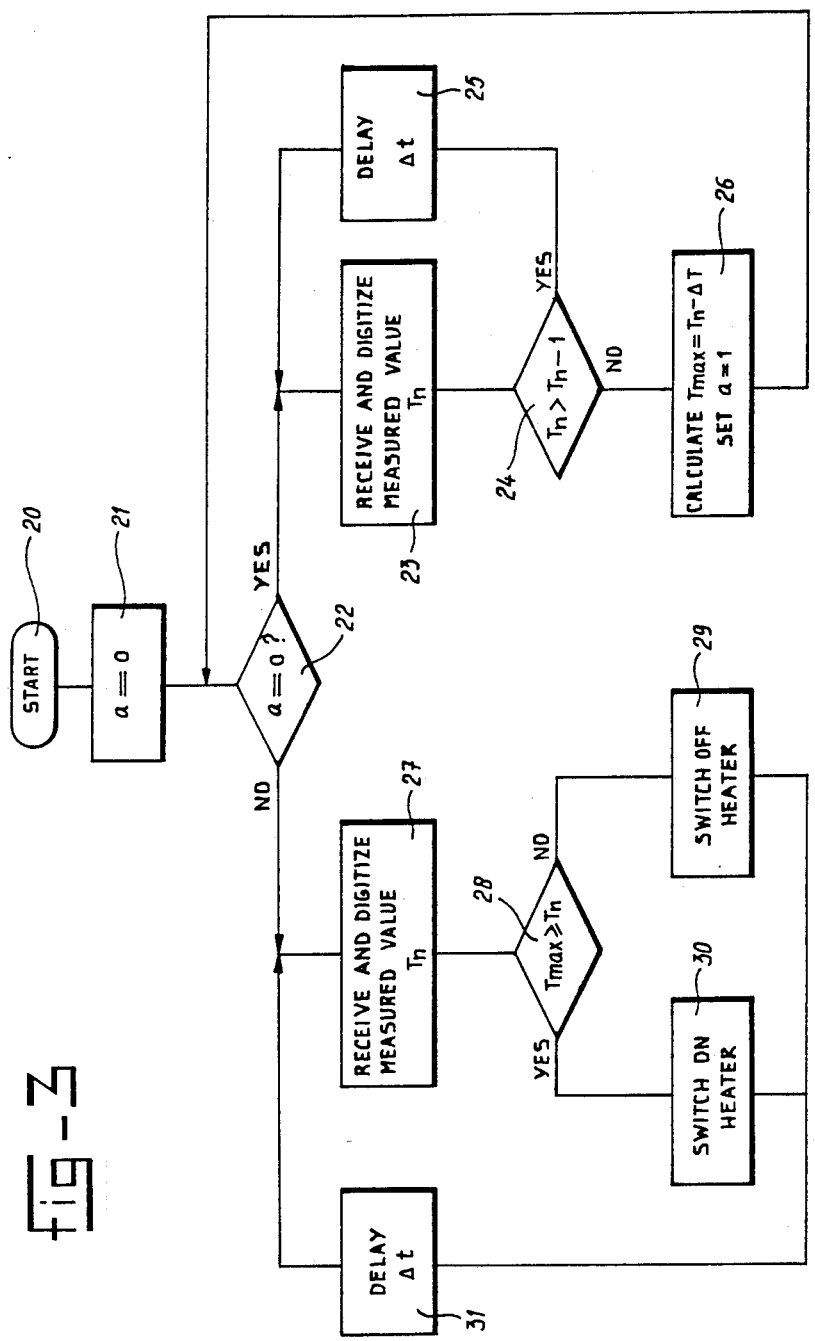
FIG. 3 shows the operation of the device on the basis of a flow chart.

Such a processor could be programmed on the basis of the flow chart which is shown in FIG. 3. In said flow chart a variable a is introduced, which in fact fulfils the same function as the switch 12 in the diagram of FIG. 1. After the start of the programme in the block 20, the variable a is set to 0 in the block 21. What value the variable a has is then examined in the block 22. Since it was set to 0 in block 21, from block 22 block 23 is proceeded to where the sensor signal is received and digitalized so that the measured value Tn is obtained. Block 24 checks whether the present measured value is higher than the previous measured value. If this is the case, the process returns to block 23 via a delay over a time period $\Delta t$ in block 25 and the subsequent measured value is received. This loop is run through immediately after the device is switched on, the water being heated from its initial temperature to the boiling point.

When the boiling point is reached, two subsequent measured values will always occur which are equal to each other. In that case the question in block 24 is answered with "no" and the maximum temperature Tmax is then calculated in block 26 and the variable a is made equal to 1. From block 26, the programme then returns to the in-put of block 22.

Since a is now equal to 1, the question in block 22 is answered by "no" and the programme proceeds with block 27 in which the next measured value is received and digitalized. In block 28 the current measured value is then compared with the maximum temperature Tmax. If the maximum temperature is higher than the measured value, then the heating must be switched on (block 30). If this is not the case then the heating must be switched off (block 29). Via a time delay over a periode $\Delta t$ (block 31), the programme then returns to block 27, wherein the following measured value is determined.

The section of said flow diagram consisting of the blocks 23, 24, 25 and 26 is therefore run through during the initializing phase of the device, in which the maximum temperature Tmax is determined. The section of the flow diagram comprising the blocks 27, 28, 29, 30 and 31 is run through in order to maintain the temperature at the desired value Tmax.

However, as will be clear to those skilled in the art, the temperature may also be maintained at a lower value than Tmax, which lower value can be selected by the user via adjustment means.

Figure 4:
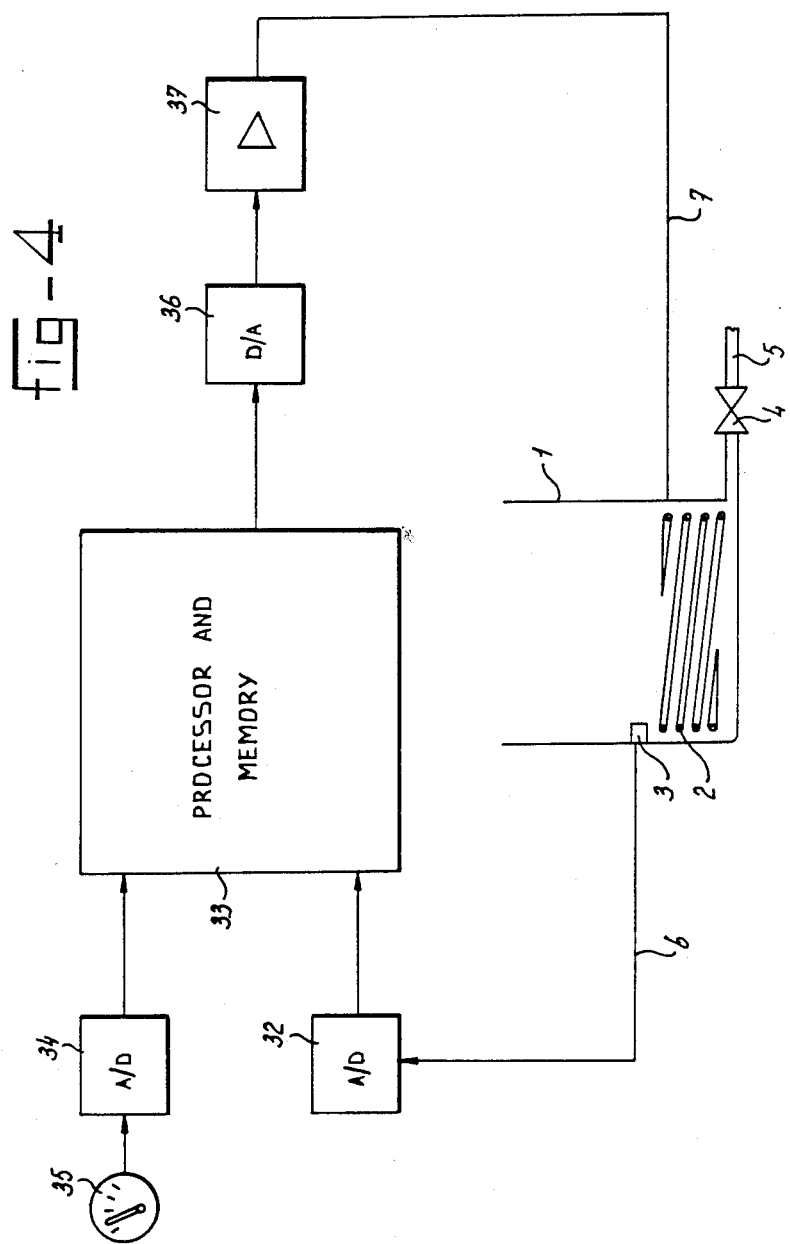
FIG. 4 illustrates schematically the major parts of the apparatus of a second embodiment.
Figure 5:
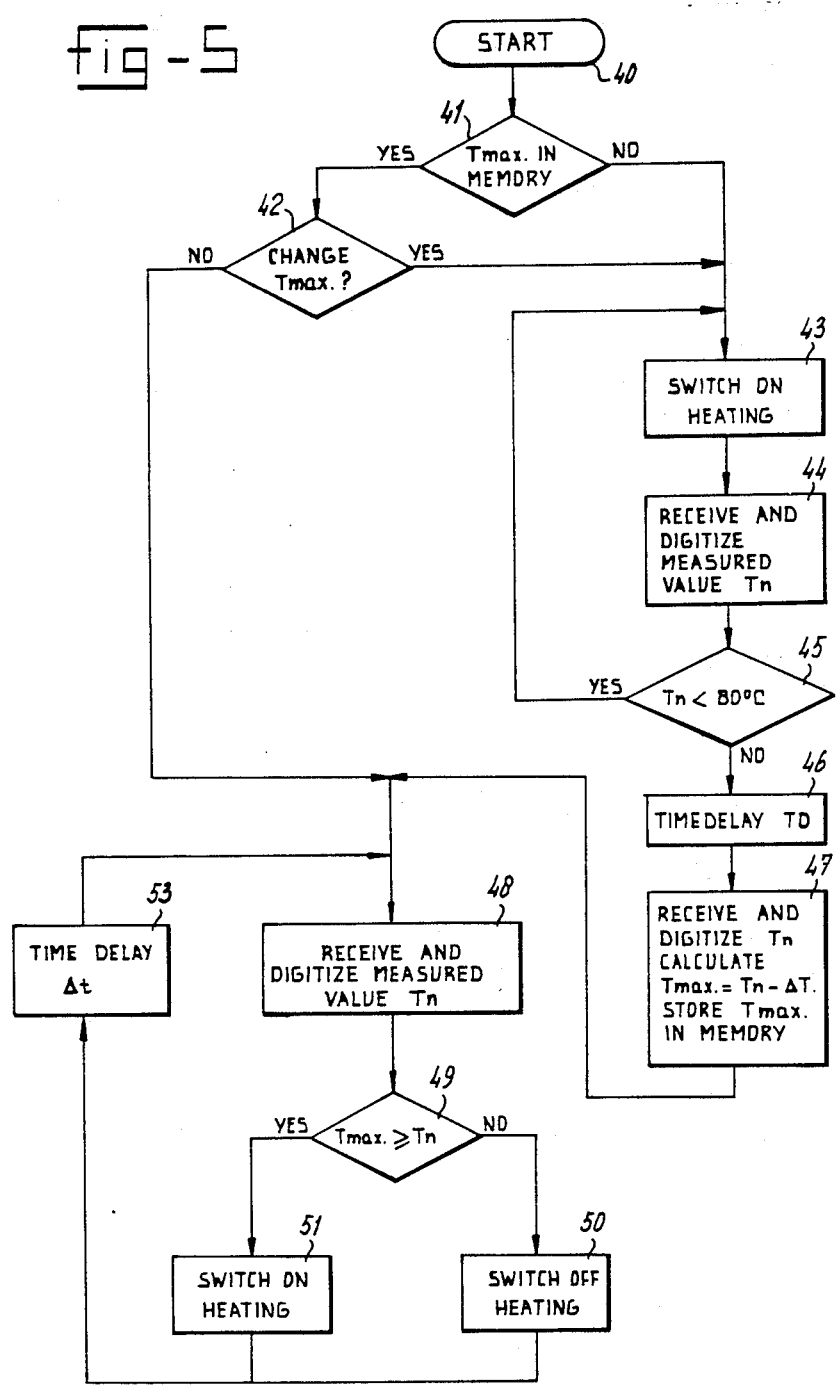
FIG. 5 illustrates a flow chart of the process carried out by the processor of FIG. 4.

A further embodiment of an apparatus according to the invention is illustrated in the FIGS. 4 and 5.

FIG. 4 illustrates very schematically the major parts of the apparatus of this second embodiment.

FIG. 5 illustrates a flow chart of the process carried out by the processor 33 of FIG. 4.

The components indicated by the reference numbers 1 . . . 7 are identical to the same components illustrated in FIG. 1. The output signal from the temperature sensor 3 is in this embodiment supplied through the line 6 to an A/D-converter 32, converting the analog measured temperature into a digital value which is supplied to a processor 33. The processor 33 receives furthermore a temperature set value from the set means 35, which can be for instance a potentiometer or a similar device, through the A/D-converter 34. The processor 33 supplies a control signal for the heater 2 through the D/A-converter 36 and the buffer amplifier 37 to line 7, connected to said heater 2.

The process, carried out within the processor 33 is schematically illustrated in the flow chart of FIG. 5. The process starts in block 40 in which the processor and memory 33 is initialized. In block 41 the memory is checked. If there is a maximum temperature value Tmax stored in the memory then the process continues with block 42 in which the user is given the choice to change Tmax or not. If he likes to change the maximum temperature value then the process continues with block 43 which block is also selected if it is found in block 41 that there is no maximum temperature value stored in the memory. In block 43 the heater 2 is switched on. Thereafter continuously the momentaneous temperature Tn is measured (block 44). The measured value Tn is continuously compared with a fixed temperature value which is selected such that this temperature value is under all circumstances below the water boiling temperature. In the example illustrated in FIG. 5 this fixed temperature value is selected at 80° C., however, any other value can be chosen as long as this fixed temperature value is below the water boiling temperature. As long as the measured momentaneous temperature Tn is below the fixed temperature value the heater remains switched on and the process runs through the loop 43, 44, 45, 43, etc.

At the moment the measured temperature Tn becomes equal to the fixed temperature value the process continues from block 45 with block 46 in which a clock function is started to measure a predetermined time period. This time period is selected such that under all circumstances the water in the reservoir 1 will reach the boiling temperature within this time period TD. It will be clear that the time delay period TD is dependent onto the contents of the water reservoir 1, upon the capacity of the heater 2 and upon the local water boiling temperature. In general the time delay period TD will be equal to several minutes for apparatuses of the small and medium sized type.

After the time delay period TD is expired the momentaneous temperature Tn is measured in block 47. Because at this instant the water in the reservoir 1 is boiling the momentaneous temperature Tn is equal to the local boiling temperature. Thereafter the value Tmax is calculated by subtracting a predetermined temperature difference $\Delta T$ from the measured temperature Tn and this calculated value Tmax is stored in the memory. Thereafter this temperature Tmax is used to control the heater 2 such that the temperature of the water in the reservoir 1 is maintained at this temperature Tmax. The process illustrated in the block 48 . . . 53 is completely equal to the process illustrated in FIG. 3 by the blocks 27 . . . 31.

Preferably in this embodiment the processor and memory 33 is connected to a back up battery or a memory of the non-volatile type is used such, that even if the mains power supply is switched off the temperature value Tmax remains stored in the memory and is ready for use as soon as the mains power supply is switched on again. If there is a temperature value Tmax stored in the memory then after initialization in block 40 the process will run through blocks 41 and 42 and will continue directly with block 48. The result thereof is that in that case the temperature of the water is raised until Tmax and is thereafter maintained at that value. In other words, the water in the reservoir 1 is not brought to a boil and therefore the energy consumption in this mode of operation is significantly reduced.

In the above description it is assumed that the value $\Delta T$ used for calculating the temperature value Tmax is a fixed value. However, in a similar way as is described for the embodiment in FIG. 1, also FIG. 4 can be embodied with temperature set means 35, through which the user of the apparatus can set a desired temperature value $\Delta T$. De set value is digitized in the A/D-converter 34 and supplied to the processor 33 in which it is used in the calculation in block 47.

I claim:

1. An apparatus for supplying hot water comprising:
a reservoir for receiving a quantity of water;
a heating unit operatively coupled to said reservoir for maintaining water in the reservoir at a desired temperature;
a temperature sensor means for sensing the temperature of water in the reservoir and for generating signals indicative of the measured temperature;
a control unit for controlling the heating unit including means for receiving said signals generated by said temperature sensor and for controlling the heating unit in response to said received signals, said control unit including a processor having:
(a) means for switching the heating unit on;
(b) means for measuring the instantaneous temperature Tn;
(c) means for comparing the measured value Tn with a fixed temperature value which is selected below the lowest expected water boiling temperature;
(d) means for repeating steps (b) and (c) as long as Tn is below said fixed temperature value;
(e) means for starting a time period measurement as soon as Tn becomes equal to said fixed temperature value for measuring a predetermined time period TD which is sufficient to assure that the water in the reservoir will reach its boiling temperature;
(f) means for measuring the instantaneous temperature Tn after the expiration of the time period TD and means for subtracting a predetermined temperature difference value T from this temperature to obtain a reference temperature Tmax which is stored in the memory of the processor; and
(g) means for using said reference temperature Tmax to control the heating unit such that the water temperature is maintained at Tmax.

2. An apparatus according to claim 1, further comprising means for varying said predetermined temperature difference value T.

3. An apparatus according to claim 1, wherein said means for using said reference temperature Tmax includes a comparator which compares said reference temperature Tmax with the actual temperature in order to generate a control signal for the heating unit.

* * * * *